J. H. VANDER VEER.
AUTOMATIC CONTROLLING DEVICE.
APPLICATION FILED OCT. 15, 1910.
1,113,388.
Patented Oct. 13, 1914.
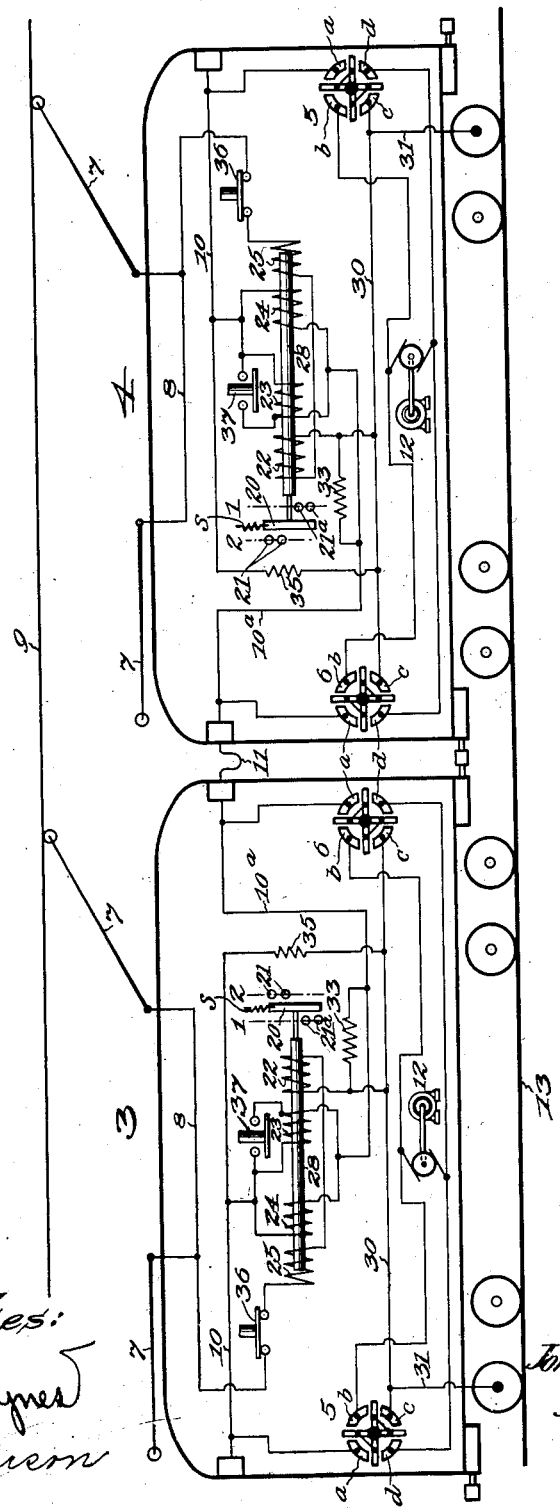
Witnesses:
Geo. Haynes
M S Petersen
Inventor:
John H. Vander Veer.
By Edwin Babb Towne
Atty.

UNITED STATES PATENT OFFICE.

JOHN H. VANDER VEER, OF BROOKLYN, NEW YORK, ASSIGNOR TO THE CUTLER-HAMMER MFG. CO., OF MILWAUKEE, WISCONSIN, A CORPORATION OF WISCONSIN.

AUTOMATIC CONTROLLING DEVICE.

1,113,388.   Specification of Letters Patent.   Patented Oct. 13, 1914.

Application filed October 15, 1910. Serial No. 587,177.

*To all whom it may concern:*

Be it known that I, JOHN H. VANDER VEER, a citizen of the United States, residing at Brooklyn, in the county of Kings and State of New York, have invented new and useful Improvements in Automatic Controlling Devices, of which the following is a full, clear, concise, and exact description, reference being had to the accompanying drawing, forming a part of this specification.

My invention relates to improvements in automatic controlling devices.

My invention is particularly adapted for direction controlling purposes in multiple unit train control system, such for instance as those illustrated in Patents Nos. 903,177 and 903,178, granted to Henry H. Cutler on November 10, 1908. It should be understood, however, that certain features of my invention may be employed for various other purposes and used in various other relations.

It is one of the objects of my invention to provide controlling devices, which may be arranged on the various cars of a multiple unit system and which may all be controlled through a single train wire to cause the desired operation thereof, regardless of the end to end relation of the cars.

Various other objects and advantages of my invention will be herein clearly and fully set forth.

For the purpose of more fully disclosing the nature and characteristic features of my invention, I shall describe the embodiment thereof illustrated in the accompanying drawing. It should be understood, however, that my invention is not limited to the particular form which I have selected for the purpose of illustration, or to the particular application thereof, herein disclosed.

In the drawing, I have shown two cars 3 and 4, each provided with the same form of my controlling device, which it will be assumed are arranged to control the reversing switches of each car. The reversing switches, motors and speed control switch have been omitted from the drawing for the purpose of simplifying the disclosure of my invention, I having only shown such parts of the general control system as are essential to a clear and full disclosure of my invention. The controller and circuit connections on each car are identical and I shall therefore only describe the controller on one of the cars, giving the controller on the other car the same reference numeral for corresponding parts. The cars are provided at opposite ends with master controllers 5 and 6, which as illustrated, are only designed for the control of the devices illustrated, it being understood that the same may be associated or combined with any form of master controller designed for the full control of the car. Each car is provided with the usual trolley 6 and 7 for electrically connecting a conductor 8 to the trolley wire 9. Also each car is provided with a single train line, the parts thereof adjacent to opposite ends of the car I have designated 10 and $10^a$. The train wires of adjacent cars are adapted to be connected by a suitable connector 11. Further, I have provided each car with a motor generator set 12, which may be controlled as disclosed in the Cutler patents aforesaid, or in any other suitable way. Each master controller is provided with four contact segments $a$, $b$, $c$ and $d$. The segments $b$ and $d$ of each controller are connected to the leads from the motor generator set 12, while the segments $a$ and $c$ are connected respectively to the train wire and to the ground. The movable element of each master controller comprises four arms electrically connected in pairs, the pairs being insulated from one another. When moved in one direction, the movable element connects segment $a$ to segment $d$, and segment $b$ to segment $c$ and when moved in the opposite direction connects segment $a$ to segment $b$ and segment $c$ to segment $d$. Thus, it makes it possible by manipulation of the master controller to connect the train line to the positive side and the rail to the negative side of the motor generator, or vice versa. The purpose of providing for this change of connection will be hereinafter clearly and fully set forth.

The device for controlling the reversing switches comprises a switch 20 having coöperating stationary contacts 21 and $21^a$ arranged on opposite sides thereof. The switch 20 normally stands between the contacts 21 and $21^a$, being biased to this position by a spring $s$ or other suitable means, and when moved in one direction bridges the contacts 21 and when moved in the opposite direction bridges contacts $21^a$. It may be assumed that the switch 20 in engaging contacts 21 energizes such switches as to cause the motors on the car to operate in one direction and when moved into engagement with contacts 21ª energizes other switches to cause the motors to operate in a reverse direction. It has been assumed that the reversing switches are electroresponsive and hence the controlling device therefor has been illustrated as a switch. It should be understood, however, that the controlling device might assume other forms in accordance with the character of the operating means for the reversing switches. The switch 20 is provided with four controlling windings 22, 23, 24 and 25, which are preferably arranged horizontally and preferably provided with a common movable core 28 connected to said switch. The controlling windings of the switch 20 are divided into two sets, one set comprising the outside windings 22 and 25 and the other set comprising the intermediate windings 23 and 24. The windings 22 and 25 are connected in series between the trolley and the ground and are connected in such a manner that current will flow through the same in opposite directions. Hence the coils 22 and 25 will oppose one another. Coils 23 and 24 are preferably connected in parallel in such a manner that they will have the same polarity. These windings are connected in parallel branches of the train wire, and hence, will be in series with the corresponding windings on the various cars of the train. Inasmuch as the outside windings 22 and 25 oppose one another and the intermediate windings 23 and 24 have the same polarity, upon energization of all the same, one of the intermediate windings will tend to neutralize the effect of one of the outside windings while the other intermediate winding and the remaining outside winding will have the same polarity and, hence, a cumulative effect. This results in the switch 20 being moved in one direction or the other in accordance with the polarity of the cumulative windings, it will thus be apparent to any one skilled in the art that the direction of the operation of the switch 20 may be regulated at will by merely reversing the polarity of the intermediate windings 23 and 24.

In the arrangement illustrated, the polarity of the windings 23 and 24 may be controlled by either of the master controllers in a manner which I shall now describe, at the same time clearly describing the circuit connections. For the purpose of this explanation. I will merely consider one car. Assuming that car 3 has been connected to the trolley wire, current will flow from conductor 8 through the windings 25 and 22 in series by conductors 30 and 31 to the rail 13. The windings 22 and 25 are thus independent of the master controller and their polarity will therefore be unaffected by the operation of the master controller or the direction in which the car travels. These windings, as before set forth and as will be obvious from an inspection of the circuit connection, have different polarities. Assuming now that one of the master controllers be moved to electrically connect segment $a$ to segment $d$ and segment $b$ to segment $c$ and further assuming that segment $d$ is connected to the positive lead from the motor generator, current will flow as follows: from segment $d$ to segment $a$ to train line 10 through the windings 23 and 24 and train line by connector 11 to the train line of the adjacent car. If, however, the car is being run singly, or is the last of the train, circuit will be completed from windings 23 and 24 through resistance 33 and conductor 30 to the rail or direct to segment $c$ of the master controller, if the car is running singly, thence to segment $b$ of the master controller to the negative lead from the motor generator. Under these conditions the windings 24 and 25 will be cumulative and the windings 22 and 23 differential, with the result that the switch 20 will be moved in the direction to engage contacts 21ª. Assuming now that the master controller be moved in an opposite direction connecting segment $a$ to segment $b$ and segment $c$ to segment $d$, the positive lead from the motor generator will be connected from segment $d$ to segment $c$ by conductor 30 through the resistance 33, thence through the windings 23 and 24 in an opposite direction to that previously described and by the train wire back to segment $a$ and segment $b$ to the negative lead from the motor generator. The polarity of the windings 23 and 24 is thus reversed, the windings 22 and 25 being unaffected. Thereupon the windings 22 and 23 will act cumulatively and the windings 24 and 25 differentially. This will cause movement of the switch 20 to engage contacts 21 causing the motors to be reversed to run the car in the opposite direction. The resistance 35 is connected in a shunt circuit around the windings 23 and 24 and the resistance 33 and serves the same function as that ascribed to the resistance 33, when the controlling switch 20 is being controlled by the master switch 6. The function of the resistance 35 will be more fully brought out hereafter.

In order to demonstrate that controllers such as those illustrated will always cause the connected cars to move in the same direction, regardless of their end to end relation, I have shown the car 4 bodily reversed with relation to car 3. In other words, the cars are so connected that the master controller 5 of car 3 is at the left hand end thereof, while the corresponding controller on car 4 is at the opposite end of the latter car. Under these conditions, it will be obvious that in order to insure operation of the two cars in the same direction, it is necessary that upon operation of one of the master controllers on either car that the direction controlling devices move to relatively different positions and therefore in the same direction. The following explanation will show that this result is insured. Assume now that both cars are connected to the trolley with the result that the windings 22 and 25 of each car will be energized as previously set forth and assume further that the master switch 5 on car 3 is moved to connect segment a with segment d and to connect segment b with segment c. Current will then be supplied to the windings 23 and 24 on each car from the motor generator set on car 3. Again assuming that segment d is connected to the positive lead of the motor generator, current will flow from segment d of the master controller 5 of car 3 to segment a, thence to train line 10 through the windings 23 and 24 in parallel by the portion 10ª of the train line to the train line of car 4, thence through the windings 23 and 24 of car 4 in parallel and thence through resistance 35 by conductor 30 to the rail, back to segment c of the master switch 5 on car 3 to segment b and to the negative lead of the motor generator on car 3. Under these conditions, as has previously been seen, the switch 20 on car 3 will be moved to the left into engagement with contacts 21ª. Referring now to car 4, it is apparent that current flows through the train wire thereof in the opposite direction to that in which it flows through the train wire of car 3, inasmuch as the end to end relation of the cars and train wires is reversed. This reverses the polarity of both of the windings 23 and 24 on car 4 relatively to the corresponding windings on car 3 and accordingly the windings 22 and 23 of car 4 become cumulative, while the windings 24 and 25 become differential, just the reverse of the action of the coils on car 3. Accordingly, the switch 20 on car 4 will also be moved to the left but into engagement with contacts 21. This secures the desired condition, to-wit, different positions of the switches 20 on the different cars, which in turn insures operation of different reversing switches on the two cars, thereby insuring movement of the cars in the same direction. Movement of the master switch 5 on car 3 in opposite direction to that just described would, as has already been seen, change the polarity of the windings 23 and 24 on car 3 causing the switch 20 on said car to move to the right and engage contacts 21. Under these conditions, the polarity of the windings 23 and 24 on car 4 would likewise be reversed causing the switch 20 on said car to also move to the right but into engagement with contacts 21ª. Again we have the controllers on the two cars brought into different relative positions, thus insuring movement of the cars in the same direction. In brief it may be stated that the operation of the controller on each car is solely dependent upon the direction of flow of current through its train wire and will always move in a given direction when the flow of current in its train wire is in a given direction. That is to say, whenever the flow of current through the train wire of any car is from left to right that car will move in a given direction regardless of which end thereof is foremost and likewise when current flows through its train wire from right to left, it will move in an opposite direction and this also being true regardless of which end of the car is foremost. The operation of the master switch 5 on car 4 would cause the same operation of the controllers on the two cars as that previously described and therefore it is needless to enter into an explanation thereof.

In practice, the reversing switches (not illustrated) are usually retained in operative position independently of their control relays, and accordingly the relays may be allowed to return to normal position as soon as the reversing switches have been set. Accordingly it might be desired in practice to deënergize the controlling windings of the controllers, which I have illustrated, as soon as the reversing switches controlled thereby have responded. This may be very readily accomplished by providing a switch 36 for opening the circuit of the windings 22 and 25 and a switch 37 for short circuiting the windings 23 and 24, said switches 36 and 37 being operated by the reversing switches when the latter responds. Any suitable means may be provided for returning the switch 20 to normal position upon deënergization of its controlling windings.

Having thus described my invention what I claim as new and desire to secure by Letters Patent, is:

1. The combination with a device movable in opposite directions into different operative positions and having means causing the same to normally assume an intermediate position, of four electro-responsive controlling windings therefor, two of said windings being of constant and opposed polarities and the other two windings being of the same polarity and simultaneously reversible to move said device into either of its operative positions from said intermediate position.

2. In combination, a device movable in two different operative positions, four electro-responsive controlling windings therefor, two of said windings being of constant and opposed polarities and the other two windings being of the same polarity and reversible in polarity, a control circuit for said latter windings, a shunt around said latter windings including two resistance sections and a tap from said shunt between said resistance sections constituting with one line of said former circuit an additional control circuit for said latter windings.

3. In combination, a plurality of devices each movable to two different operative positions, and separate electro-responsive operating means for each of said devices, all of said operating means being controllable through a single circuit to cause said devices to move to the same or different positions according to the relation thereof.

4. In combination, a plurality of devices each movable in opposite directions, separate electro-responsive means for moving each of said devices in either direction and a common control circuit for all of said electro-responsive means insuring movement of all of said devices in the same direction irrespective of the end-to-end relation thereof.

5. In combination, a plurality of devices each movable to a plurality of different operative positions, separate electro-responsive operating means for said devices, and series connections between certain of the operating windings of each of said devices for controlling the operation of all of said devices and changing the positions thereof at will.

6. In combination, a plurality of devices each movable to a plurality of different operative positions, separate electro-responsive operating means for said devices, and series connections between certain of the operating windings of each of said devices for controlling the operation of all of said devices and changing the positions thereof at will, each of said devices upon bodily reversal relatively to another device being insured a relatively reverse operation by said control circuit.

7. In a multiple unit system, a plurality of units, a direction controlling device for each unit, separate electro-responsive operating means for each of said devices, and a single control circuit for said electro-responsive means to cause operation of all of said units in the same direction irrespective to the end-to-end connection thereof.

8. In a multiple unit system, in combination, a plurality of units, a direction controlling device for each unit, separate electro-responsive operating means for each of said devices, and a control circuit common to all of said electro-responsive means, each of said devices having its operation reversed by reversal of current in said control circuit and each of said devices being insured a reversal of current upon bodily reversal of its respective unit.

9. In a multiple unit train control system, in combination, a plurality of cars, separate electro-responsive direction controlling means for the several cars, and a single train wire controlling said means to cause all cars to move in the same direction irrespective of the end-to-end relation of said cars.

10. In a multiple unit train control system, in combination, a plurality of cars, separate electro-responsive direction controlling means for the several cars, and a single train wire controlling said means to cause all cars to move in the same direction irrespective of the end-to-end relation of said cars, certain of the operating windings of each of said direction controlling means being connected between the terminals of its respective section of said train wire.

11. In a multiple unit train control system, in combination, a plurality of cars, an electro-responsive direction-controlling device arranged on each car, and a common control circuit for all of said devices, the windings of said several devices effecting operation thereof in the same or different relative ways in accordance with the end-to-end relation of said cars.

12. In a multiple unit train control system, in combination, a plurality of cars, an electro-responsive direction-controlling device arranged on each car, each having different operative positions, and a common control circuit for all of said devices, the windings of said devices causing the same to assume the same or different relative positions in accordance with the end-to-end relation of said cars.

13. In a multiple unit train control system, in combination, a plurality of cars constituting a train, a control wire extending throughout the length of the train, and an electro-responsive direction controlling device arranged on each car, the windings of each of said devices effecting operation thereof in different ways upon reversal of current through the section of the control wire on its corresponding car.

14. In a multiple unit train control system, in combination, a plurality of cars constituting a train, a control wire extending throughout the length of the train, and an electro-responsive direction controlling device arranged on each car to be controlled through said control wire and to operate in different ways upon reversal of current in the said wire, each of said devices having certain of its operating windings connected between the terminals of its respective section of said control wire to insure a reversal of current therethrough upon a bodily reversal of its respective car.

15. In a multiple unit system, in combination, a plurality of units, separate electro-responsive direction controlling means for the several units, and a single control circuit for said electro-responsive means, each of said electro-responsive means responding to said control circuit in different ways upon bodily reversal of its respective unit.

16. In a multiple unit train control system, in combination, a plurality of cars, an electroresponsive direction controlling device arranged on each car and movable in opposite directions to reverse the direction of operation of its corresponding car and a common control circuit for all of said devices, said devices all operating in the same direction regardless of the end to end relation of said cars.

17. In a multiple unit train control system, in combination, a plurality of cars, an electroresponsive direction controlling device arranged on each car, each of said devices having a plurality of sets of windings all adapted to be energized to cause said device to be operated in different ways, the windings of one set being controllable independently of the windings of the other set and a common control circuit for controlling the independently controlled windings of the various cars, the independently controlled windings causing the operation of their respective devices in different ways upon reversal of current therethrough, said independently controlled windings having the flow of current therethrough inherently reversed upon a bodily reversal of its corresponding car.

18. In a multiple unit train control system, in combination, a plurality of cars, an electroresponsive direction controlling device arranged upon each car of the system, each of said devices having a plurality of sets of operating windings all adapted to be energized to cause the same to operate in opposite directions, the windings of each device being divided into sets, one set being controlled independently of the other, the independently controlled sets of windings of the devices being connected in series throughout the system and adapted upon energization thereof to cause said devices to operate in the same or different ways in accordance with the end to end relation of said cars and upon reversal of current therethrough to cause said devices to move in an opposite direction.

19. In a multiple unit train control system, a plurality of cars, a plurality of electroresponsive direction controlling devices, one arranged on each car of the system, each of said devices being movable in opposite directions into different operative positions and having controlling windings divided into sets of two windings each, the windings of one set having different polarities and being energized independently of the other set, the windings of the other set having the same polarity and being in series with the corresponding windings of all of said cars, the polarity of said second mentioned set of windings determining the direction of operation of its corresponding device, the bodily reversal of each car inherently changing the polarity of direction controlling windings thereon.

In witness whereof, I have hereunto subscribed my name in the presence of two witnesses.

JOHN H. VANDER VEER.

Witnesses:
  ROLLIN A. SPALDING, Jr.,
  CLEVELAND E. WATROUS.